United States Patent [19]

Miyake et al.

[11] Patent Number: 4,586,992

[45] Date of Patent: May 6, 1986

[54] PROCESS FOR PRODUCING POTASSIUM HYDROXIDE

[75] Inventors: Haruhisa Miyake; Hiroaki Ito; Koji Suzuki; Ryoji Yamada, all of Yokohama, Japan

[73] Assignee: Asahi Glass Company, Ltd., Tokyo, Japan

[21] Appl. No.: 733,870

[22] Filed: May 14, 1985

[30] Foreign Application Priority Data

May 29, 1984 [JP] Japan .................... 59-107618

[51] Int. Cl.$^4$ .................................... C25B 1/10
[52] U.S. Cl. ........................ 204/98; 204/128; 204/296
[58] Field of Search ................ 204/98, 128, 296

[56] References Cited

U.S. PATENT DOCUMENTS

| | | | |
|---|---|---|---|
| 3,941,667 | 3/1976 | Von Semel et al. | 204/98 |
| 4,062,743 | 12/1977 | Ahn et al. | 204/98 |
| 4,233,122 | 11/1980 | Lynch et al. | 204/98 |
| 4,253,923 | 3/1981 | Lynch et al. | 204/296 |
| 4,255,240 | 3/1981 | Nolnar et al. | 204/296 |
| 4,261,803 | 4/1981 | Suhara et al. | 204/98 |
| 4,272,338 | 6/1981 | Lynch et al. | 204/98 |
| 4,313,805 | 2/1982 | Burney et al. | 204/296 |
| 4,323,436 | 4/1982 | Itoi et al. | 204/98 |
| 4,337,137 | 6/1982 | Ezzell | 204/296 |
| 4,426,271 | 1/1984 | Yoshida et al. | 204/296 |
| 4,431,504 | 2/1984 | Seitz et al. | 204/296 |
| 4,434,041 | 2/1984 | Kelley et al. | 204/98 |
| 4,437,951 | 3/1984 | Bissot et al. | 204/296 |
| 4,490,484 | 12/1984 | Bissot et al. | 204/296 |

FOREIGN PATENT DOCUMENTS

| | | | |
|---|---|---|---|
| 51-11098 | 1/1976 | Japan | 204/98 |
| 0050480 | 4/1980 | Japan | 204/98 |

*Primary Examiner*—John F. Niebling
*Assistant Examiner*—Terryence Chapman
*Attorney, Agent, or Firm*—Oblon, Fisher, Spivak, McClelland & Maier

[57] ABSTRACT

A process for producing potassium hydroxide by electrolysis of potassium chloride in an electrolytic cell comprising an anode compartment and a cathode compartment partitioned by a cation exchange membrane, which process comprises supplying potassium chloride to the anode compartment for the electrolysis to form potassium hydroxide in the cathode compartment, characterized in that said cation exchange membrane is a multi-layer membrane comprising at least two layers including a main layer made of a perfluorocarbon polymer having carboxylic acid groups as its ion exchange groups with an ion exchange capacity of from 0.9 to 1.6 meq/g dry resin and having a thickness of from 80 to 300 μm and a sulfonic acid film surface layer on the anode compartment side, made of a perfluorocarbon polymer having sulfonic acid groups as its ion exchange groups with an ion exchange capacity of from 0.5 to 1.5 meq/g dry resin and having a thickness of from 5 to 50 μm.

4 Claims, No Drawings

PROCESS FOR PRODUCING POTASSIUM HYDROXIDE

The present invention relates to a process for producing potassium hydroxide. More particularly, it relates to a novel process for the production of high quality potassium hydroxide by the electrolysis of potassium chloride with low electric resistance and high current efficiency by using a cation exchange membrane having a specific multi-layered structure including a main layer of a carboxylic acid type perfluoropolymer film, as the diaphragm.

Heretofore, a process for producing potassium hydroxide by the electrolysis of potassium chloride by using cation exchange fluoropolymer membranes as diaphragms, is well known as a process which has no substantial pollution problem as compared with the mercury process, and which is capable of producing highly concentrated high purity potassium hydroxide at a high current efficiency as compared with the asbestos diaphragm process. Accordingly, various proposals have been made for the cation exchange membranes to be used for this process. One of the proposals is a method of using a sulfonic acid type cation exchange membrane. However, the purity of potassium hydroxide thereby obtained is not necessarily adequate, and there has been pointed out a difficulty that the current efficiency decreases when highly concentrated potassium hydroxide is to be obtained. In order to overcome such difficulties of the sulfonic acid type cation exchange membrane, there have been proposed various methods, such as a method wherein the water content of the ion exchange membrane is controlled to be within a specified range, as disclosed in Japanese Examined Patent Publication No. 3998/1978, a method wherein a carboxylic acid type perfluorocarbon polymer membrane is used, as disclosed in Japanese Unexamined Patent Publication No. 65372/1980 or in U.S. Pat. No. 4,233,122, a method wherein a sulfonic acid type membrane having a specific structure and formed with a layer having a low specific conductivity, is used, as disclosed in Japanese Unexamined Patent Publication No. 92185/1982, and a method wherein a multi-layered membrane produced by laminating a carboxylic acid and sulfonic acid composite film layer on a sulfonic acid type film, is used, as disclosed in U.S. Pat. No. 4,434,041.

The present inventors have conducted various researches and studies on the electrolysis of potassium chloride wherein cation exchange fluoropolymer membranes are used as diaphragms, and have found the following facts. Namely, a sulfonic acid type membrane has a difficulty in obtaining a high current efficiency for the production of highly concentrated potassium hydroxide, as pointed out heretofore, and a difficulty in effectively preventing leakage of potassium chloride from the anode compartment to the cathode compartment, whereby it is difficult to avoid the inclusion of potassium chloride in the formed potassium hydroxide, and the purity will be impaired. On the other hand, a carboxylic acid type membrane is capable of attaining a high current efficiency in the production of highly concentrated potassium hydroxide, but is said to be disadvantageous in respect of the electric resistance as compared with the sulfonic acid type membrane. The durability against a pH decrease at the surface on the anode compartment side, is small, and accordingly adequate dissociation of the functional groups at the surface layer on the anode compartment side is likely to be impaired, whereby it becomes difficult to effectively prevent the leakage of potassium chloride from the anode compartment to the cathode compartment. Further, with a multi-layer membrane comprising a sulfonic acid type film as the main layer as disclosed in Japanese Unexamined Patent Publication No. 92185/1982 or U.S. Pat. No. 4,434,041, no adequate solution can be expected with respect to the difficulties in the leakage of potassium chloride and the low current efficiency as pointed out with respect to the sulfonic acid type membrane.

The present inventors have made a study to overcome the above-mentioned difficulties, and have found that high quality potassium hydroxide can be prepared in a high concentration at a high current efficiency by employing a multi-layer type membrane comprising a main layer made of a specific carboxylic acid type perfluorocarbon polymer and a thin surface layer formed on the anode compartment side and made of a specific sulfonic acid type perfluorocarbon polymer. The present invention has been accomplished on the basis of this discovery. Further, the multi-layer membrane having such a specific multi-layer structure is capable of attaining low resistance and has adequate durability against the pH decrease at the surface on the anode compartment side, whereby high efficiency is obtainable over a long period of time.

Namely, the present invention provides a process for producing potassium hydroxide by electrolysis of potassium chloride in an electrolytic cell comprising an anode compartment and a cathode compartment partitioned by a cation exchange membrane, which process comprises supplying potassium chloride to the anode compartment for the electrolysis to form potassium hydroxide in the cathode compartment, characterized in that said cation exchange membrane is a multi-layer membrane comprising at least two layers including a main layer made of a perfluorocarbon polymer having carboxylic acid groups as its ion exchange groups with an ion exchange capacity of from 0.9 to 1.6 meq/g dry resin and having a thickness of from 80 to 300 $\mu$m and a sulfonic acid film surface layer on the anode compartment side, made of a perfluorocarbon polymer having sulfonic acid groups as its ion exchange groups with an ion exchange capacity of from 0.5 to 1.5 meq/g dry resin and having a thickness of from 5 to 50 $\mu$m.

Now, the present invention will be described in detail with reference to the preferred embodiments.

In the present invention, it is important to use a specific multi-layer membrane. Firstly, it is important to employ a specific carboxylic acid film main layer. The specific carboxylic acid film main layer is made of a perfluorocarbon polymer having carboxylic acid groups as its ion exchange groups with an ion exchange capacity of from 0.9 to 1.6 meq/g dry resin and having a thickness of from 80 to 300 $\mu$m. In a preferred embodiment, the ion exchange capacity of the specific carboxylic acid film main layer is preferably selected within a range of from 1.0 to 1.4 meq/g dry resin, and the thickness is preferably selected within a range of from 100 to 250 $\mu$m. If the ion exchange capacity is too small, the electric resistance tends to be excessive as a cation exchange membrane. On the other hand, if the ion exchange capacity is excessive, the effect for the prevention of leakage of potassium chloride tends to decrease, and there will be a disadvantage also with respect to the effect for obtaining highly concentrated potassium hydroxide at a high current efficiency. If the thickness of the specific carboxylic acid film main layer is excessive, the electric resistance tends to increase, and if the thickness is too small, the significance of the carboxylic acid membrane as the main layer decreases, and it tends to be difficult to attain a high current efficiency or to prevent the leakage of potassium chloride.

Secondly, it is important that the specific multilayer membrane in the present invention has a specific sulfonic acid film surface layer at the anode compartment side. The specific sulfonic acid film surface layer is made of a perfluorocarbon polymer having sulfonic acid groups as its ion exchange groups with an ion exchange capacity of from 0.5 to 1.5 meq/g dry resin, preferably from 0.8 to 1.3 meq/g dry resin. The thickness of the specific sulfonic acid film surface layer is selected within a range of from 5 to 50 μm, preferably from 10 to 40 μm. If the ion exchange capacity is too small, even when the sulfonic acid film surface layer is relatively thin, there will be a disadvantage with respect to the electric resistance as the cation exchange membrane. On the other hand, if the ion exchange capacity is excessive, there will be a disadvantage in the strength as a thin film layer. As mentioned above, the thickness of the specific sulfonic acid film surface layer may be relatively small. However, if the thickness is too small, there will be a disadvantage in the strength as a thin film layer, and the effect for providing durability against the pH decrease tends to decrease. On the other hand, if the thickness is excessive, an excess portion from the functional aspect as a durability-providing layer against the pH decrease, increases, and the total thickness of the multi-layer membrane increases, whereby the difficulties of the conventional sulfonic acid type membrane will be pronounced.

The specific multi-layer membrane in the present invention comprises the above-mentioned specific carboxylic acid film main layer and the specific sulfonic acid film surface layer as the essential constituting layers. However, in a preferred embodiment, an intermediate layer may be interposed for the purpose of improving the bondage at the interface between the main layer and the surface layer. As such an intermediate layer, there may be employed various layers so long as they have an intermediate swelling property upon absorption of water, thereby to absorb or reduce the difference in the swelling due to the difference in the water absorption between the specific carboxylic acid film main layer and the specific sulfonic acid film surface layer. As a preferred embodiment of such an intermediate layer, there may be mentioned a perfluorocarbon polymer film layer wherein sulfonic acid groups and carboxylic acid groups are present in a mixed state. Particularly preferred is a thin layer of a blend comprising a sulfonic acid type perfluorocarbon polymer and a carboxylic acid type perfluorocarbon polymer. The blend film layer as the intermediate layer is conveniently prepared from a mixture comprising the polymer for the specific carboxylic acid film main layer and the polymer for the specific sulfonic acid film surface layer. The blend film layer may be a layer of a uniform mixture comprising 100 parts by weight of the carboxylic acid type perfluorocarbon polymer and from 25 to 400 parts by weight, preferably from 50 to 300 parts by weight of a sulfonic acid type perfluorocarbon polymer, and its thickness is preferably selected within a range of from 5 to 50 μm, more preferably from 10 to 40 μm. As such an intermediate layer, it is of course possible to employ a perfluorocarbon polymer film layer having both carboxylic acid groups and sulfonic acid groups, such as the one obtained by copolymerizing a carboxylic acid type monomer and a sulfonic acid type monomer.

In the present invention, the specific multi-layer membrane may have still further constituting layers in addition to the above preferred intermediate layer, so long as it contains the above-mentioned essential constituting layers. For instance, the specific carboxylic acid film main layer may be made of a plurality of layers having different ion exchange capacities, or a layer having a superior effect for the prevention of the reverse diffusion of hydroxyl ions may be provided on the cathode compartment side of the specific carboxylic acid film main layer. Namely, for instance, a thin film surface layer made of a carboxylic acid type perfluorocarbon polymer having an ion exchange capacity smaller than the ion exchange capacity of the main layer, may be formed on the cathode compartment side of the specific carboxylic acid film main layer. In such a case, the surface layer on the cathode compartment side may preferably be made of a perfluorocarbon polymer having carboxylic acid groups with an ion exchange capacity of from 0.7 to 1.5 meq/g dry resin, preferably from 0.8 to 1.4 meq/g dry resin and having a thickness of from 5 to 50 μm, preferably from 10 to 40 μm. When such a carboxylic acid film surface layer having a small ion exchange capacity is formed on the cathode compartment side surface of the specific carboxylic acid film main layer, both layers may be integrally laminated with a carboxylic acid film intermediate layer having an intermediate ion exchange capacity interposed therebetween.

In the present invention, the carboxylic acid type perfluorocarbon polymer and the sulfonic acid type perfluorocarbon polymer constituting the above-mentioned respective layers, are not particularly restricted to those known or well-known in the art, and any types may be employed so long as they satisfy the above-mentioned specific requirements. According to a preferred embodiment, it is particularly preferred to employ a polymer having the following structures (i) and (ii):

  (i)

  (ii)

where X is F or —CF$_3$, preferably F, and Y is selected from the following groups:

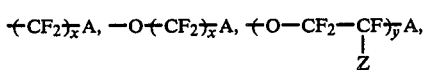

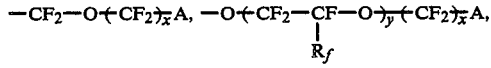

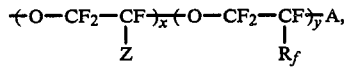

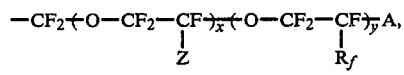

-continued

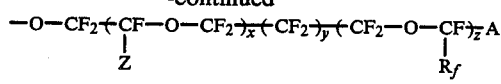

where each of x, y and z is from 0 to 10, and each of Z and $R_f$ is selected from the group consisting of —F or a perfluoroalkyl group having from 1 to 10 carbon atoms. Further, A is —SO$_3$M or —COOM, or a group which can be converted to such groups by hydrolysis, such as —SO$_2$F, —CN, —COF or —COOR, where M is a hydrogen atom or an alkali metal, and R is an alkyl group having from 1 to 10 carbon atoms.

The multi-layer type membrane of the present invention has a total thickness of from 90 to 350 μm, preferably from 100 to 300 μm, and if required, it may be reinforced by a woven fabric such as a cloth or a net, or a non-woven fabric, preferably made of e.g. polytetrafluoroethylene, or by a metallic mesh or perforated sheet. Otherwise, the membrane of the present invention may be reinforced by blending fibrillated fibers of polytetrafluoroethylene as disclosed in e.g. Japanese Unexamined Patent Publications Nos. 149881/1978, 1283/1979, 107479/1979 and 157777/1979, or by blending fibrillated fibers of polytetrafluoroethylene modified by the copolymerization with a small amount of an acid type functional group-containing monomer, as disclosed in e.g. Japanese Unexamined Patent Publication No. 79110/1981. Further, it is possible to employ reinforcement by blending other low molecular weight polymers. Further, the multi-layer type membrane of the present invention may be modified by roughening its surface, or by forming a porous thin layer composed of metal oxide particles on its surface. When the above-mentioned various reinforcing means are to be employed in the present invention, it is preferred to apply them to the carboxylic acid film main layer.

In the present invention, the film-forming for each layer or the mixing for the preparation of the blend composite film layer may be conducted by various conventional methods. For instance, the mixing may be conducted in a wet system by using an aqueous dispersion, an organic solution or an organic dispersion of an ion exchange group-containing perfluorocarbon polymer. The film forming can be conducted by a casting method by using such an organic solution or organic dispersion. Of course, the dry blending system may be employed, or the film formation may be conducted by a heat melting molding method. When a film for each layer is formed by the heat melting molding method, the ion exchange groups of the starting polymer should take a suitable form not to lead to decomposition thereof. For instance, in the case of carboxylic acid groups, they should preferably take a form of an acid or an ester, and in the case of sulfonic acid groups, they should preferably take a form of —SO$_2$F. Alternatively, the starting material polymer may firstly be pelletized by heat melting molding, and then molded by extrusion or press molding into a film.

The multi-layer type membrane of the present invention is usually prepared in such a manner that the carboxylic acid film main layer, the sulfonic acid film surface layer and, if necessary, the composite film layer or the carboxylic acid film surface layer, are respectively separately prepared in the form of predetermined films, and they are laminated integrally. As the method for the integral lamination of the layers, there may be mentioned flat plate pressing or roll pressing. The temperature for pressing is usually from 60° to 280° C., and the pressure is from 0.1 to 100 kg/cm$^2$ by the flat plate pressing and from 0.1 to 100 kg/cm by roll pressing.

In the electrolysis of potassium chloride according to the present invention, any type of electrodes may be used. For instance, there may be employed perforated electrodes such as foraminous plates, nets, punched metals or expanded metals. As the perforated electrode, there may be mentioned an expanded metal having openings with a long opening diameter of from 1.0 to 10 mm and a short opening diameter of from 0.5 to 10 mm, the wire diameter of from 0.1 to 1.3 mm and an opening rate of from 30 to 90%. Further, a plurality of plate-like electrodes may also be used. It is particularly preferred to use a plurality of electrodes having different opening rates, wherein electrodes having smaller opening rates are disposed close to the membrane.

The anode may usually be made of a platinum group metal or its electro-conductive oxides or electroconductive reduced oxides. On the other hand, the cathode may be made of a platinum group metal, its electro-conductive oxides or an iron group metal. As the platinum group metal, there may be mentioned platinum, rhodium, ruthenium, palladium and iridium. As the iron group metal, there may be mentioned iron, cobalt, nickel, Raney nickel, stabilized Raney nickel, stainless steel, an alkali etching stainless steel (U.S. Pat. No. 4,255,247), Raney nickel-plated cathode (U.S. Pat. Nos. 4,170,536 and 4,116,804) and Rodan nickel-plated cathode (U.S. Pat. Nos. 4,190,514 and 4,190,516).

In the case where perforated electrodes are used, the electrodes may be made of the above-mentioned materials for the anode or cathode. However, when a platinum group metal or its electro-conductive oxides are used, it is preferred to coat these substances on the surface of an expanded metal made of a valve metal such as titanium or tantalum.

When an electrode is to be installed, it may be disposed in contact with the multi-layer type membrane of the present invention, or may be disposed with a space from the membrane. The electrode should be pressed gently rather than firmly against the membrane surface. For instance, the electrode is preferably gently pressed under pressure of from 0 to 2.0 kg/cm$^2$ against the ion exchange membrane surface.

The electrolytic cell in which the multi-layer type membrane of the present invention is used, may be a monopolar type or bipolar type. With respect to the material constituting the electrolytic cell, for instance, in the case of the anode compartment, a material resistant to an aqueous potassium chloride solution and chlorine, such as a valve metal like titanium, may be used, and in the case of the cathode compartment, iron, stainless steel or nickel resistant to potassium hydroxide and hydrogen, may be used.

The electrolysis of an aqueous potassium chloride solution by using the multi-layer type membrane of the present invention, may be conducted under conventional conditions. For instance, the electrolysis is conducted preferably at a temperature of from 80° to 120° C. at a current density of from 10 to 100 A/dm$^2$ while supplying preferably a 2.5–5.0N potassium chloride aqueous solution to the anode compartment and water or diluted potassium hydroxide to the cathode compartment. In such a case, it is preferred to minimize the presence of heavy metal ions such as calcium or magnesium in the aqueous potassium chloride solution, since such heavy metal ions bring about a deterioration of the ion-exchange membrane. Further, in order to prevent as far as possible the generation of oxygen at the anode, an acid such as hydrochloric acid may be added to the aqueous potassium chloride solution.

According to the process of the present invention, by employing the specific multi-layer type membrane comprising a specific carboxylic acid film main layer and a specific sulfonic acid film surface layer as the essential constituting layers, it is possible to attain a high current efficiency of at least 90% even for highly concentrated potassium hydroxide having a concentration of from 30 to 40%, and yet it is possible to produce high quality potassium hydroxide and chlorine with low resistance. Particularly, as compared with the conventional membrane having a sulfonic acid film main layer, it is thereby possible to better prevent the leakage of potassium chloride from the anode compartment, whereby it is possible to obtain from the cathode compartment high quality potassium hydroxide having an extremely low KCl content, such as a KCl content of less than 50 ppm. Such an effect can be attained constantly and certainly over a long period of time.

Now, the present invention will be described in further detail with reference to Examples. However, it should be understood that the present invention is by no means restricted by these specific Examples. In the Examples "parts" means "parts by weight" unless otherwise specified.

EXAMPLE 1

Into a 0.2 liter stainless steel pressure reactor, 100 g of deionized water, 0.2 g of $C_8F_{17}COONH_4$, 0.51 g of $NaH_2PO_4.2H_2O$, 0.1 g of $(NH_4)_2S_2O_8$, 0.017 g of isopropanol and 20 g of $CF_2=CFO(CF_2)_3COOCH_3$ were charged. After thoroughly deaerating with liquid nitrogen, the temperature was raised to 60° C., and tetrafluoroethylene was introduced to a pressure of 14 kg/cm² to start the reaction. During the reaction, tetrafluoroethylene was continuously introduced from outside to maintain the pressure at the constant level. Five hours later, the reaction was terminated, and 20.5 g of a copolymer was obtained. The ion exchange capacity of the copolymer was 1.32 meq/g. This copolymer was designated as A.

Then, into a 0.2 liter stainless steel reactor, 22 g of trichlorotrifluoroethane, 78 g of

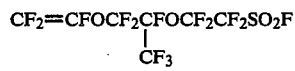

and 0.1 g of azobisisobutyronitrile were charged. After thoroughly deaerating with liquid nitrogen, the temperature was raised to 70° C., and tetrafluoroethylene was charged to a pressure of 12.3 kg/cm² to start the reaction. During the reaction, tetrafluoroethylene was continuously introduced to maintain the pressure at the constant level. Seven hours later, 14.5 g of a copolymer was obtained, and it had an ion exchange capacity of 1.1 meq/g. This copolymer was designated as B.

Copolymer A was press-molded at 230° C. to obtain a film having a thickness of 230 μm. Then, copolymer B was press-molded at 230° C. to obtain a film having a thickness of 30 μm. Then, copolymer A and copolymer B were blended at a weight ratio of 1:1, then roll-kneaded at 130° C., and press-molded at 230° C. to obtain a film having a thickness of 15 μm. Then, the three sheets of films i.e. the copolymer A film, the copolymer B film and the blend film interposed therebetween, were laminated at 200° C. by means of heat rolls. The membrane thus obtained was hydrolyzed in a 20% potassium hydroxide aqueous solution at 90° C. for 16 hours to obtain a potassium type ion exchange membrane.

To the B layer side of the membrane thus obtained, an anode prepared by coating a solid solution of ruthenium oxide, iridium oxide and titanium oxide on a titanium expanded metal (short opening diameter: 2 mm, long opening diameter: 5 mm) and having a low chlorine overvoltage, was pressed to be in contact with the membrane. Likewise, to the A layer side of the membrane, a cathode prepared by electrodepositing a ruthenium-containing Raney nickel (ruthenium: 5%, nickel: 50%, aluminum: 45%) on a SUS 304 punched metal (short opening diameter: 2 mm, long opening diameter: 5 mm) and having a low hydrogen overvoltage, was pressed to be in contact with the membrane. Then, electrolysis was conducted at 90° C. at a current density of 30 A/dm², while supplying a 3.5N potassium chloride aqueous solution to the anode compartment and water to the cathode compartment, and maintaining the potassium chloride concentration in the anode compartment to a level of 2.3N and the potassium hydroxide concentration in the cathode compartment to a level of 35% by weight.

As the results, the current efficiency was 97.5%, and the cell voltage was 3.15 V. The potassium chloride content in the formed potassium hydroxide solution was 24 ppm. The membrane used for the electrolysis for 10 days was examined, and no abnormality was observed.

EXAMPLE 2

In the same manner as in Example 1, a laminated membrane comprising the copolymer B film, the blend film and the copolymer A film, was prepared. On the other hand, a mixture comprising 10 parts of zirconium oxide powder having a particle size of 5 μm, 0.4 part of methyl cellulose (viscosity of 2% aqueous solution: 1500 centipoise), 19 parts of water, 2 parts of cyclohexanol and 1 part of cyclohexanone, was kneaded to obtain a paste. The paste was screen-printed on the B layer side of the laminated membrane, with use of a Tetron screen having 200 mesh and a thickness of 75 μm, a printing plate provided with a screen mask having a thickness of 30 μm beneath the screen and a squeegee made of polyurethane. The printed layer on the membrane surface was dried in air.

Then, on the other side (i.e. on the A layer side) of the membrane having a porous layer thus obtained, α-silicon carbide particles having an average particle size of 5 μm were deposited. Thereafter, the particle layers on the respective membrane surfaces were press-fixed to the ion exchange membrane surfaces at a temperature of 140° C. under a pressure of 30 kg/cm², to obtain an ion exchange membrane with zirconium oxide particles and silicon carbide particles deposited in an amount of 1.0 mg/cm² and 1.0 mg/cm² respectively on the anode side and the cathode side of the membrane. The ion exchange membrane thus obtained was hydrolyzed and used for the electrolysis under the same conditions as disclosed in Example 1, whereby current efficiency was 97.0%, and the cell voltage was 3.00 V.

The potassium chloride content in the formed potassium hydroxide solution was 20 ppm.

EXAMPLE 3

In the same manner as in Example 1, a copolymer of tetrafluoroethylene with $CF_2=CFO(CF_2)_3COOCH_3$ having an ion exchange capacity of 1.44 meq/g, was obtained. The copolymer was designated as A'. Copolymer A' was press-molded into a film having a thickness of 230 μm. Then, a copolymer of tetrafluoroethylene with

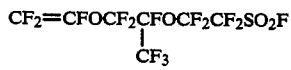

having an ion exchange capacity of 0.90 meq/g, was obtained. This copolymer was designated as B'. Copolymer B' was press-molded to obtain a film having a thickness of 15 μm. Further, copolymers A' and B' were blended at a weight ratio of 1:1, then roll-kneaded at 130° C., and press-molded to obtain a film having a thickness of 15 μm. Then, copolymer A' film and the copolymer B' film were laminated with a blend film interposed therebetween by means of heat rolls. The laminated membrane was treated in the same manner as in Example 2 to obtain an ion exchange membrane having α-silicon carbide particles having an average particle size of 0.3 μm deposited on the A' layer side in an amount of 1.0 mg/cm² and zirconium oxide having an average particle size of 1 μm deposited on the B' layer side in an amount of 1.0 mg/cm², and the hydrolysis and electrolysis were conducted under the same conditions as in Example 1 except that the current density was changed to 40 A/dm². As the results, the current efficiency was 97.5%, and the cell voltage was 3.13 V, the potassium chloride content in the formed potassium hydroxide solution was 18 ppm. The membrane used for the electrolysis for 30 days, was examined, and no abnormality was observed in the membrane.

The membrane used for the electrolysis for 230 days was examined, and no abnormality was observed in the membrane.

We claim:

1. A process for producing potassium hydroxide by electrolysis of potassium chloride in an electrolytic cell comprising an anode compartment and a cathode compartment partitioned by a cation exchange membrane, which process comprises:

supplying potassium chloride to the anode compartment for the electrolysis which forms potassium hydroxide in the cathode compartment, said cation exchange membrane being a multi-layer membrane comprising at least three layers including a main layer formed of a perfluorocarbon polymer having carboxylic acid groups as its ion exchange groups with an ion exchange capacity of from 0.9 to 1.6 meq/g dry resin and having a thickness of from 80 to 300 μm, a sulfonic acid film surface layer on the anode compartment side formed of a perfluorocarbon polymer having sulfonic acid groups as its ion exchange groups with an ion exchange capacity of from 0.5 to 1.5 meq/g dry resin and having a thickness of from 5 to 50 μm, and a composite film layer interposed therebetween which is formed of a perfluorocarbon polymer having both carboxylic acid and sulfonic acid groups and having a thickness of from 5 to 50 μm.

2. The process according to claim 1, wherein the composite film layer is made of a blend comprising a perfluorocarbon polymer having carboxylic acid groups as its ion exchange groups and a perfluorocarbon polymer having sulfonic acid groups as its ion exchange groups.

3. The process according to claim 1, wherein the composite film layer is made of a blend comprising a perfluorocarbon polymer constituting the main layer and a perfluorocarbon polymer constituting the sulfonic acid film surface layer.

4. The process according to claim 3, wherein the composite film layer is made of a blend comprising 100 parts by weight of a perfluorocarbon polymer having carboxylic acid groups as its ion exchange groups and from 25 to 400 parts by weight of a perfluorocarbon polymer having sulfonic acid groups as its ion exchange groups.

* * * * *